United States Patent [19]
Ogiwara et al.

[11] Patent Number: 6,035,636
[45] Date of Patent: Mar. 14, 2000

[54] MASTER CYLINDER

[75] Inventors: Takato Ogiwara; Kenji Sano, both of Yamanashi-ken, Japan

[73] Assignee: Tokico Ltd., Kawasaki, Japan

[21] Appl. No.: 09/039,422

[22] Filed: Mar. 16, 1998

[30]    Foreign Application Priority Data

Mar. 17, 1997 [JP] Japan .................................. 9-083319

[51] Int. Cl.[7] .................................................. B60T 11/26
[52] U.S. Cl. ............................................................ 60/585
[58] Field of Search .............................................. 60/585

[56]             References Cited

FOREIGN PATENT DOCUMENTS 55-161747  11/1980   Japan .
 6-12243    2/1994   Japan .

Primary Examiner—F. Daniel Lopez
Attorney, Agent, or Firm—Wenderoth, Lind & Ponack, L.L.P.

[57]             ABSTRACT

In the master cylinder of the present invention, a cylindrical portion of a grommet seal includes at least two outer sealing projections on an outer circumferential surface thereof, an inner sealing projection on an inner circumferential surface thereof at a position corresponding to a recess between the outer sealing projections, and an abutting portion adapted to abut against a positioning stepped portion provided in a supply fitting of a reservoir. When the supply fitting is inserted into the grommet seal fitted in a boss of a cylinder body, deformation of the inner sealing projection is relieved by a cavity constituted by the recess between the outer sealing projections. When a hydraulic pressure is applied to the cylindrical portion of the grommet seal, because the abutting portion of the grommet seal abuts against the positioning stepped portion of the supply fitting of the reservoir, the cylindrical portion is axially compressed, so that sealability of the sealing projections can be improved.

8 Claims, 4 Drawing Sheets

MASTER CYLINDER

BACKGROUND OF THE INVENTION

The present invention relates to a master cylinder which is advantageously used in, for example, a brake or a clutch for a vehicle.

Generally, a master cylinder used in a vehicle, such as an automobile, mainly comprises a cylinder body having a boss on an outer circumferential surface thereof, a reservoir having on its bottom a supply fitting to be connected to the boss of the cylinder body and a grommet seal having a cylindrical portion and a flange portion. The cylindrical portion of the grommet seal serves to seal a space between an inner circumferential surface of the boss of the cylinder body and an outer circumferential surface of the supply fitting of the reservoir.

With respect to the above-mentioned master cylinder, for example, Unexamined Japanese Utility Model Public Disclosure No. 55-161747 discloses a master cylinder including a grommet seal which serves as a connecting member for connecting the cylinder body and the reservoir by engagement.

In the master cylinder disclosed in Unexamined Japanese Utility Model Public Disclosure No 55-161747, the boss of the cylinder body has a first engaging projection which Projects Radially inwards from the boss on a side of an open end thereof. The supply fitting of the reservoir has a second engaging projection which projects radially outward from an outer circumferential surface of the supply fitting.

In this master cylinder, the cylinder body and the reservoir are connected as stated below. That is, the grommet seal is fitted into the boss of the cylinder body to thereby engage the first engaging projection with an outer circumferential surface of the grommet seal. The supply fitting of the reservoir is pushed into the grommet seal fitted in the boss to thereby engage the second engaging projection with an inner circumferential surface of the grommet seal. Thus, the grommet seal engages both the first engaging projection formed in the boss of the cylinder body and the second engaging projection formed in the supply fitting of the reservoir; Consequently the cylinder body and the reservoir are connected while being engaged with the grommet seal provided therebetween.

In the above-mentioned conventional master cylinder, although means for connecting the cylinder body and the reservoir is provided, the grommet seal also serves as a connecting member for connecting the cylinder body and the reservoir. In order to firmly connect the cylinder body and the reservoir by engagement, the grommet seal is arranged to be capable of being fitted between the boss and the supply fitting without any clearance. That is, the grommet seal has a dimension which causes a high degree of interference when the supply fitting is inserted into the grommet seal fitted in the boss.

When the supply fitting is inserted into the grommet seal which has been fitted into the boss, resistance to insertion is high due to the high degree of interference from the grommet seal. Therefore, to connect the boss of the cylinder body and the supply fitting of the reservoir, a machine, such as a press-fitting machine, must be used. Thus, an operation for assembling a master cylinder requires the use of equipment and is cumbersome, thereby lowering productivity.

Further, when the supply fitting is forcibly press-fitted into the grommet seal using the press-fitting machine, the grommet seal suffers abnormal deformation because portion thereof is driven into an interface between the grommet seal and an associated surface and is therefore likely to be damaged. When the grommet seal is damaged, leakage of hydraulic fluid occurs, thereby lowering reliability of the grommet seal.

BRIEF SUMMARY OF THE INVENTION

In view of the above, the present invention has been made. It is a primary object of the present invention to provide a master cylinder in which the cylinder body and the reservoir can be easily connected and a space between the cylinder body and the reservoir can be securely sealed.

The master cylinder or hydraulic fluid cylinder of the present invention comprises a cylinder body having a boss on an outer circumferential surface thereof, a reservoir having on a bottom thereof a supply fitting adapted to be connected to the boss of the cylinder body and a grommet seal having a cylindrical portion and a flange portion. The cylindrical portion of the grommet seal is capable of sealing a space between an inner circumferential surface of the boss of the cylinder body and an outer circumferential surface of the supply fitting of the reservoir.

In the present invention, the supply fitting of the reservoir includes on the outer circumferential surface thereof a positioning stepped portion for restricting upward axial movement of the grommet seal. The cylindrical portion of the grommet seal includes at least two outer sealing projections on an outer circumferential surface thereof which extend in a circumferential direction of the grommet seal. The cylindrical portion of the grommet seal also includes an inner sealing projection on an inner circumferential surface thereof at a position between the outer sealing projections, and the inner sealing projection extends in a circumferential direction of the grommet seal. An abutting portion of the grommet seal is provided above the inner sealing projection so as to abut against the positioning stepped portion of the reservoir.

By this arrangement, when the grommet seal is inserted into the boss of the cylinder body, the outer sealing projections on the outer circumferential surface of the cylindrical portion of the grommet seal abut against the inner circumferential surface of the boss. Therefore an annular cavity is formed between the outer sealing projections. Subsequently, when the supply fitting of the reservoir is inserted into the grommet seal, a tip of the inner sealing projection of the grommet seal is radially outwardly deformed. The deformation of the tip of the inner sealing projection can be relieved in the annular cavity between the outer sealing projections, because this cavity is formed at a position corresponding to the inner sealing projection. Therefore, the supply fitting can be easily inserted into the grommet seal.

Further, when hydraulic pressure is applied from the cylinder body to the grommet seal, the hydraulic pressure acts to upwardly move the entire cylindrical portion of the grommet seal. However, the abutting portion on the inner circumferential surface of the cylindrical portion abuts against the positioning stepped portion on the outer circumferential surface of the supply fitting of the reservoir. Thus upward movement of the cylindrical portion of the grommet seal can be restricted. Therefore, the outer sealing projection on a side of the cylinder body is pushed upwardly by the hydraulic pressure and strongly pressed against the inner circumferential surface of the boss, and the inner sealing projection is strongly pressed against the outer circumferential surface of the supply fitting by a reaction force. Thus, sealability of these sealing projections becomes high.

DETAILED DESCRIPTION OF THE INVENTION

Figure 1:
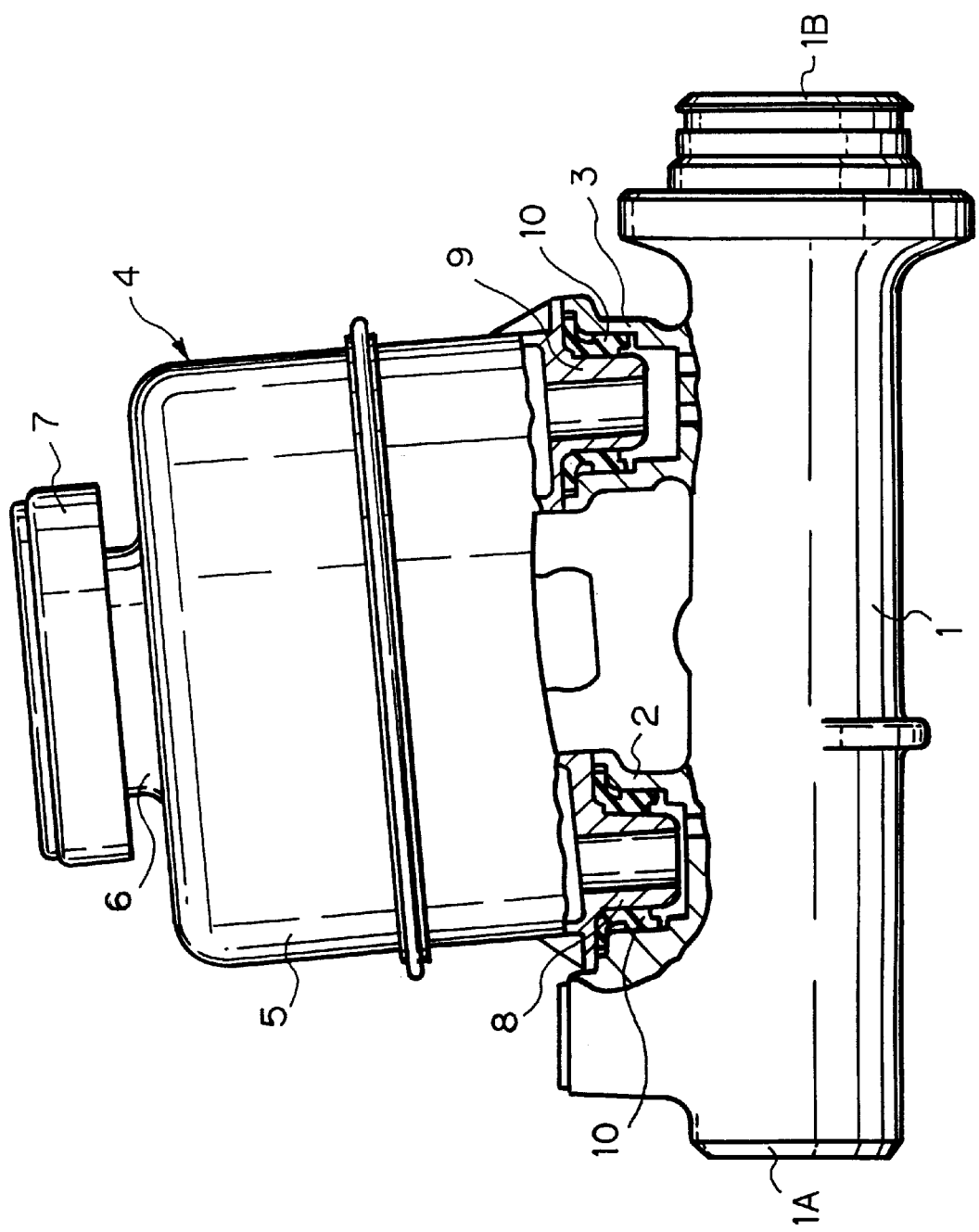
FIG. 1 is a front view of a partially cut-away master cylinder for a brake according to an embodiment of the present invention.

Hereinbelow, an embodiment of the present invention is explained in detail, with reference to the accompanying drawings. In this embodiment, a master cylinder for a brake is taken as an example of the master cylinder in the present invention.

Reference numeral 1 denotes a cylinder body for a tandem master cylinder used in a dual circuit hydraulic brake. The cylinder body 1 is formed into a substantially cylindrical shape having one end closed (closed end 1A) and the other end open (open end 1B). A piston (not shown) is slidably fitted into the cylinder body 1 from the open end 1B. The piston is axially moved through the cylinder body 1 by a brake pedal during a braking operation.

Figure 2:
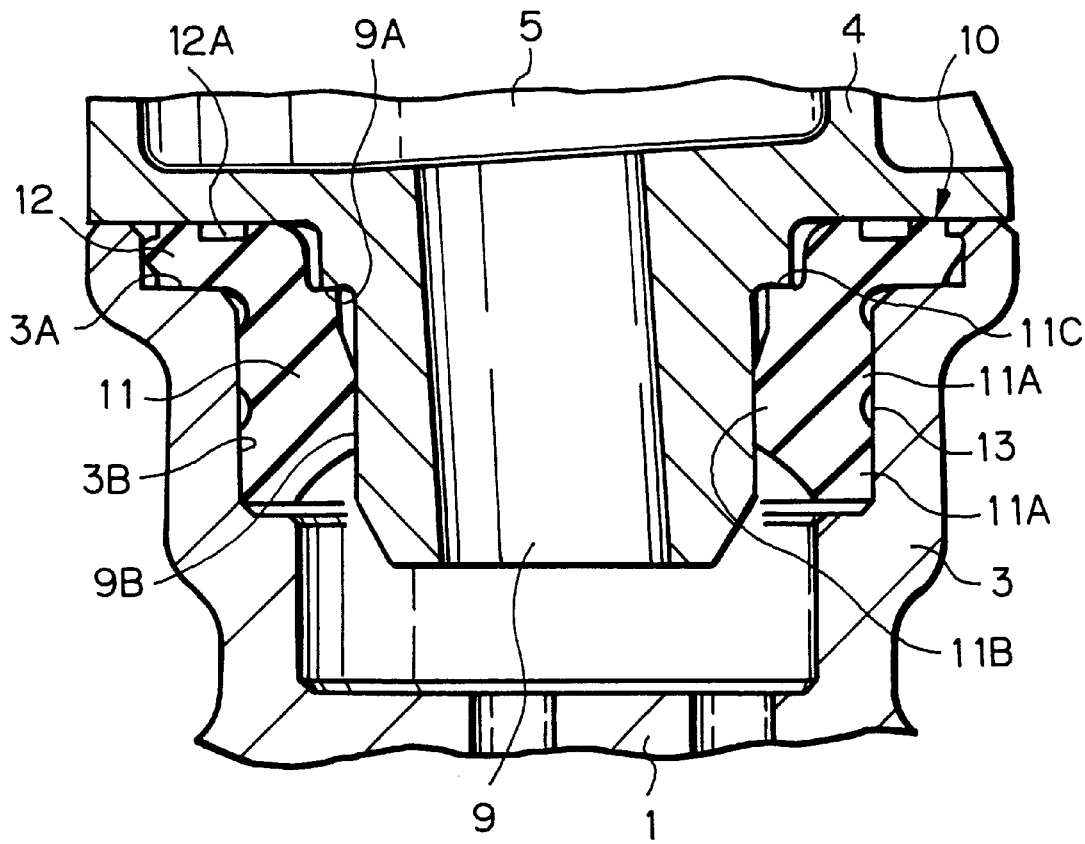
FIG. 2 is an enlarged cross-sectional view of an essential part of the master cylinder of FIG. 1, showing the boss, supply fitting and grommet seal.

Reference numerals 2 and 3 denote two bosses radially upwardly projecting from an outer circumferential surface of the cylinder body 1 at two positions spaced from each other in an axial direction of the cylinder body 1. Of these bosses 2 and 3, for example, the boss 3 is formed into a stepped cylinder as shown in FIG. 2 and has on an inner circumferential surface thereof a flange supporting stepped portion 3A and an inner sealing surface 3B. The bosses 2 and 3 are removably connected to supply fittings 8 and 9 of a reservoir 4 which is explained later. A hydraulic fluid filled in the reservoir 4 flows between the reservoir 4 and the cylinder body 1 through the bosses 2 and 3.

The reservoir 4 is connected to the cylinder body 1 and mainly comprises a reservoir body 5 in which the hydraulic fluid is filled, a supply inlet 6 for the hydraulic fluid integrally formed with an upper surface of the reservoir body 5 and a cap 7 for closing the supply inlet 6. The supply fittings 8 and 9 are integrally formed with a bottom of the reservoir body 5.

Each of the supply fittings 8 and 9 integrally formed with the bottom of the reservoir body 5 has a cylindrical form extending downward from the bottom of the reservoir body 5. The supply fittings 8 and 9 are provided in a spaced relationship at positions which correspond to the bosses 2 and 3 of the cylinder body 1, respectively. Of the supply fittings 8 and 9, for example, the supply fitting 9 is formed into a stepped cylinder as shown in FIG. 2. An upper portion of the outer circumferential surface of the supply fitting 9 is radially outwardly projected to thereby form a positioning stepped portion 9A. The positioning stepped portion 9A is adapted to abut against an abutting portion 11C of a grommet seal 10 (which is explained later). The outer circumferential surface of the supply fitting 9 below the positioning stepped portion 9A constitutes an outer sealing surface 9B. The supply fittings 8 and 9 are, respectively, connected to the bosses 2 and 3 of the cylinder body 1 with the grommet seals 10 being provided therebetween.

The grommet seals 10 are fitted between the bosses 2 and 3 of the cylinder body 1 and the supply fittings 8 and 9 of the reservoir 4. Each of the grommet seals 10 comprises a cylindrical portion 11 and a flange portion 12 and is formed from, for example, a synthetic rubber material having a relatively high hardness which is at least about $H_s 60$.

Figure 3:
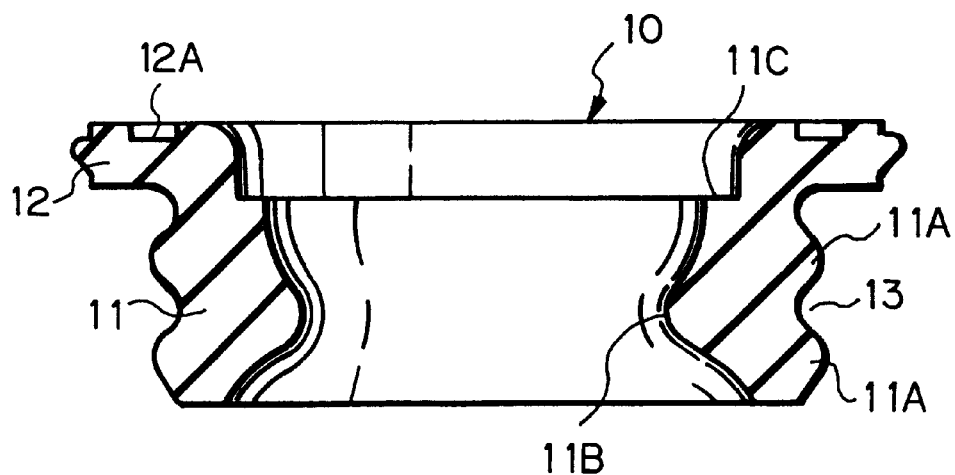
FIG. 3 is a cross-sectional view of the grommet seal in a free state.

The cylindrical portion 11 of the grommet seal 10 includes two outer sealing projections 11A. As shown in FIG. 3, when the grommet seal 10 is in a free state, the outer sealing projections 11A project radially outwardly from the outer circumferential surface of the cylindrical portion 11. When the grommet seal 10 is fitted into, for example, the boss 3, the outer sealing projections 11A are brought into intimate contact with the inner sealing surface 3B of the boss 3. The outer sealing projections 11A are spaced from each other at a predetermined distance in an axial direction of the cylindrical portion 11, so that an annular recess 13 is formed between the outer sealing projections 11A. Further, the cylindrical portion 11 of the grommet seal 10 includes an inner sealing projection 11B projecting radially inwardly from the inner circumferential surface of the cylindrical portion 11. For example, when the supply fitting 9 is fitted into the grommet seal 10, the inner sealing projection 11B is brought into intimate contact with the outer sealing surface 9B of the supply fitting 9. The inner sealing projection 11B is provided at a position corresponding to the recess 13 formed between the outer sealing projections 11A.

An abutting portion 11C is provided on the inner circumferential surface of the cylindrical portion 11 at a position above the inner sealing projection 11B. As used herein, the terms "downward", "upward", "above" and "bottom" refer to an axial direction of the boss(es) and supply fitting(s) of the master cylinder. In other words, the arrangement refers to a direction from the cylinger body 1 (bottom) to the reservoir 4 (top) so that the abutting portion 11C is above the inner sealing projection 11B. For example, when the supply fitting 9 is fitted into the grommet seal 10, the abutting portion 11C abuts against the positioning stepped portion 9A of the supply fitting 9. When hydraulic pressure is applied from the cylinder body 1 to the cylindrical portion 11, the abutting portion 11C serves to prevent upward movement of the entire cylindrical portion 11.

Further, an annular groove 12A is formed on an upper surface of the flange portion 12 of the grommet seal 10. Due to the annular groove 12A, leakage of the hydraulic fluid is prevented between the grommet seal 10 and the reservoir 4 during assembly of the master cylinder.

Figure 4:
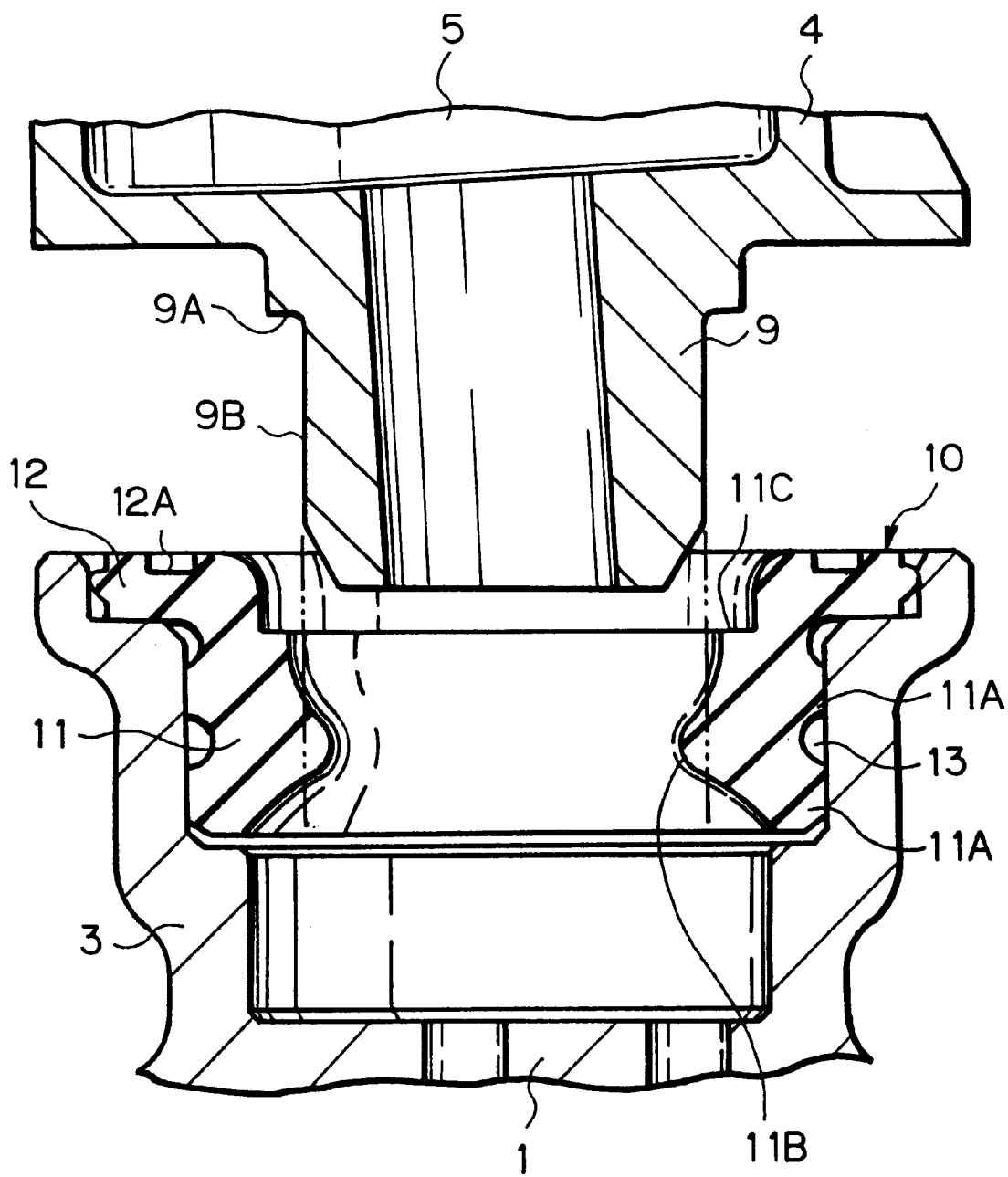
FIG. 4 is an enlarged cross-sectional view of the essential part of the master cylinder, showing how the supply fitting is inserted into the grommet seal fitted in the boss.

Next, explanation is made of an operation for connecting the supply fittings 8 and 9 of the reservoir 4 to the bosses 2 and 3 of the cylinder body referring to FIG. 4, this connection is made with the grommet seals 10 being provided between the supply fittings and the bosses.

Initially, the grommet seals 10 are inserted into the bosses 2 and 3, respectively. For example, as shown in FIG. 4, the flange portion 12 of the grommet seal 10 is engaged with the flange supporting stepped portion 3A of the boss 3, and the outer sealing projections 11A of the cylindrical portion 11 of the grommet seal 10 are brought into intimate contact with the inner sealing surface 3B of the boss 3. In this instance, respective tips of the outer sealing projections 11A are slightly deformed, and the annular recess 13 between the outer sealing projections 11A constitutes an annular cavity.

Subsequently, the supply fittings 8 and 9 of the reservoir 4 are inserted into the grommet seals 10 fitted in the bosses 2 and 3, respectively. As shown in FIG. 4a, when the grommet seal is in a free state, a tip of the inner sealing projection 11B inwardly projects beyond a two-dot chain line which indicates the outer sealing surface 9B when the supply fitting 9 is fitted in the grommet seal 10. The inner sealing projection 11B is formed on the inner circumferential surface of the cylindrical portion 11 at a position corresponding to the cavity 13. Therefore, when the supply fitting 9 is pushed into the grommet seal 10, compression of the tip of the inner sealing projection 11B by the outer sealing surface 9B in a radially outward direction can be relieved by the cavity 13, so that the supply fitting 9 can be easily inserted into the grommet seal 10.

Incidentally, in the master cylinder in this embodiment of the present invention, the grommet seals 10 are not employed for the purpose of mechanically connecting the cylinder body 1 to the reservoir 4. As in the case of the above-mentioned Unexamined Japanese Utility Model Public Disclosure No. 55-161747, the master cylinder of this embodiment, uses a connecting means other than the grommet seals 10 for mechanically connecting the cylinder body and the reservoir, although such connecting means is not shown in the drawings.

The master cylinder for a brake in this embodiment of the present invention which is arranged as mentioned above is operated as follows. In order to brake a vehicle, the piston in the cylinder body 1 is axially moved by a brake pedal and the hydraulic fluid in the reservoir 4 is supplied through the supply fittings 8 and 9 to the cylinder body 1. Thus, the hydraulic fluid in the cylinder body 1 is supplied to brake cylinders (not shown).

The hydraulic fluid flows between the cylinder body 1 and the reservoir 4 in the above-mentioned manner during a braking operation. The grommet seals 10 are provided between the bosses 2 and 3 of the cylinder body 1 and the supply fittings 8 and 9 of the reservoir 4, respectively. Therefore, the cylinder body 1 and the reservoir 4 can be connected in a liquid-tight manner, so that leakage of hydraulic fluid from the connection between the cylinder body 1 and the reservoir 4 to the outside can be prevented.

Figure 5:
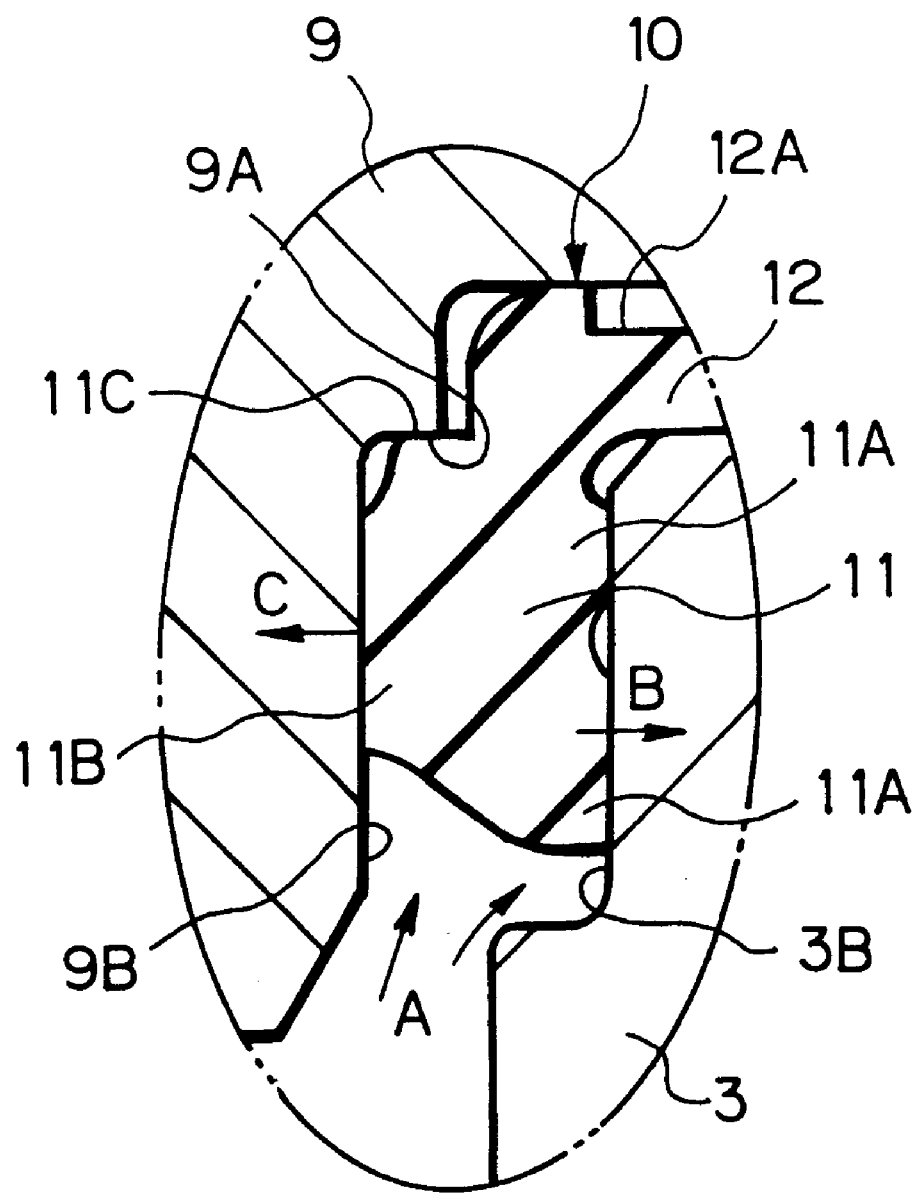
FIG. 5 is an enlarged cross-sectional view of the essential part of the master cylinder, showing how a hydraulic pressure is applied from the cylinder body to the cylindrical portion of the grommet seal.

On the other hand, as shown in FIG. 5, when a hydraulic pressure A is applied from the cylinder body 1 to, for example, the grommet seal 10 between the boss 3 and the supply fitting 9, the hydraulic pressure A acts to upward push the entire cylindrical portion 11. However, the abutting portion 11C of the cylindrical portion 11 which abuts against the positioning stepped portion 9A of the supply fitting 9 restricts upward movement of the cylindrical portion 11. Therefore, the cylindrical portion 11 is axially compressed so that the outer sealing projection 11A is strongly pressed against the inner sealing surface 3B of the boss 3 in a direction indicated by an arrow B. Simultaneously the inner sealing projection 11B is strongly pressed against the outer sealing surface 9B of the supply fitting 9 by a reaction force, in a direction indicated by an arrow C. Thus, sealability of the outer sealing projection 11A and inner sealing projection 11B becomes satisfactorily high.

In the above-mentioned embodiment of the present invention, the grommet seal 10 includes two outer sealing projections 11A projecting radially outwardly projecting from the outer circumferential surface of the cylindrical portion. The grommet seal 10 also includes an inner sealing projection 11B projecting radially inward projecting from the inner circumferential surface of the cylindrical portion 11 at a position corresponding to the recess 13 between the outer sealing projections 11A. Therefore, for example, when the supply fitting 9 of the reservoir 4 is inserted into the grommet seal 10 fitted in the boss 3, compression of the inner sealing projection 11B of the grommet seal 10 is relieved by the cavity constituted by the opposing recess 13 between the outer sealing projections 11A. Therefore the tip of the inner sealing projection 11B can be deformed in a radially outward direction by the outer sealing surface 9B of the supply fitting 9 without difficulty.

Because the tip of the inner sealing projection 11B of the grommet seal 10 can be easily deformed, insertion of the supply fittings 8 and 9 into the grommet seals 10 (which has been conventionally conducted using a press-fitting machine), can be conducted manually. Therefore, an operation for assembling a master cylinder can be easily conducted, thereby improving productivity. In addition, abnormal deformation of the grommet seal 10 can be suppressed, thereby preventing damage to the cylindrical portion 11 and leakage of the hydraulic fluid, leading to improvement in reliability of the grommet seal 10.

Further, when the hydraulic pressure is applied from the cylinder body 1 to, the grommet seal 10 provided for example between the boss 3 and the supply fitting 9, the abutting portion 11C of the cylindrical portion 11 of the grommet seal 10 abuts against the positioning stepped portion 9A of the supply fitting 9. Thus upward movement of the entire cylindrical portion 11 is restricted. Consequently, the cylindrical portion 11 is axially compressed by the hydraulic pressure, and the outer sealing projection 11A and the inner sealing projection 11B can be pressed strongly against the inner sealing surface 3B of the boss 3 and the outer sealing surface 9B of the supply fitting 9, respectively. Therefore, sealability of these outer sealing projection 11A and inner sealing projection 11B becomes high, thereby improving reliability of the grommet seal 10.

Incidentally, in the above-mentioned embodiment, two outer sealing projections 11A are provided on the outer circumferential surface of the cylindrical portion 11 and one inner sealing projection 11B is provided on the inner circumferential surface of the cylindrical portion 11 at a position corresponding to the recess 13 between the outer sealing projections 11A. However, in the present invention, 3 or more outer sealing projections may be provided on the outer circumferential surface of the cylindrical portion 11 and two or more inner sealing projections may be provided on the inner circumferential surface of the cylindrical portion 11.

Further, in the above-mentioned embodiment, a master cylinder for a brake is taken as an example of the master cylinder of the present invention. However, the present invention may be applied to, for example, a master cylinder for a clutch.

What is claimed is:

1. A master cylinder comprising:

a cylinder body having an outer circumferential surface and a boss on said outer circumferential surface, said boss having an inner circumferential surface;

a reservoir having a bottom portion and a supply fitting on said bottom portion, said supply fitting having an outer circumferential surface and being adapted to be connected to said boss of said cylinder body; and a grommet seal including a cylindrical portion and a flange portion, said cylindrical portion being capable of sealing between said inner circumferential surface of said boss and said outer circumferential surface of said supply fitting, said cylindrical portion including:

A) an inner circumferential surface and an outer circumferential surface;
B) at least two outer sealing projections on said outer circumferential surface of said cylindrical portion, said at least two outer sealing projections extending in a circumferential direction of said cylindrical portion;
C) at least one inner sealing projection on said inner circumferential surface of said cylindrical portion, said at least one inner sealing projection being located between said at least two outer sealing projections with respect to an anal direction of said cylindrical portion, said at least one inner sealing projection extending in a circumferential direction of said cylindrical portion; and
D) an abutting portion located above said at least one inner sealing projection;

wherein said supply fitting includes a positioning stepped portion on said outer circumferential surface thereof for restricting upward axial movement of said grommet seal, said abutting portion of said grommet seal abutting against said positioning stepped portion.

2. The master cylinder of claim 1, wherein said supply fitting includes a first cylindrical portion adapted to seal against said cylindrical portion of said grommet seal, and a second cylindrical portion having a diameter larger than a diameter of said first cylindrical portion, said positioning stepped portion being formed between said first cylindrical portion and said second cylindrical portion.

3. The master cylinder of claim 1, wherein said at least two outer sealing projections extend in a circumferential direction of said cylindrical portion around an entirety of an outer circumference of said cylindrical portion, and said at least one inner sealing projection extends in a circumferential direction of said cylindrical portion around an entirety of an inner circumference of said cylindrical portion.

4. The master cylinder of claim 1, wherein said cylindrical portion includes at least two inner sealing portions and more than two outer sealing projections, wherein each of said inner sealing portions is located between a different adjacent pair of said outer sealing projections with respect to an axial direction of said cylindrical portion.

5. A hydraulic fluid cylinder comprising:
a cylinder body having an outer circumferential surface, a boss on said outer circumferential surface, and an outlet for a pressurized fluid, said boss having an inner circumferential surface;
a piston slidably fitted in said cylinder body, said piston being capable of moving so as to discharge the pressurized hydraulic fluid in said cylinder body through said outlet;
a reservoir having a bottom portion and a supply fitting on said bottom portion, said supply fitting having an outer circumferential surface and being adapted to be connected to said boss of said cylinder body; and
a grommet seal including a cylindrical portion and a flange portion, said cylindrical portion being capable of sealing between said inner circumferential surface of said boss and said outer circumferential surface of said supply fitting, said cylindrical portion including:
A) an inner circumferential surface and an outer circumferential surface;
B) at least two outer sealing projections on said outer circumferential surface of said cylindrical portion, said at least two outer sealing projections extending in a circumferential direction of said cylindrical portion;
C) at least one inner sealing projection on said inner circumferential surface of said cylindrical portion, said at least one inner sealing projection being located between said at least two outer sealing projections with respect to an axial direction of said cylindrical portion, said at least one inner sealing projection extending in a circumferential direction of said cylindrical portion; and
D) an abutting portion located above said at least one inner sealing projection;

wherein said supply fitting includes a positioning stepped portion on said outer circumferential surface thereof for restricting upward axial movement of said grommet seal, said abutting portion of said grommet seal abutting against said positioning stepped portion.

6. The hydraulic fluid cylinder of claim 5, wherein said supply fitting includes a first cylindrical portion adapted to seal against said cylindrical portion of said grommet seal, and a second cylindrical portion having a diameter larger than a diameter of said first cylindrical portion, said positioning stepped portion being formed between said first cylindrical portion and said second cylindrical portion.

7. The hydraulic fluid cylinder of claim 5, wherein said at least two outer sealing projections extend in a circumferential direction of said cylindrical portion around an entirety of an outer circumference of said cylindrical portion, and said at least one inner sealing projection extends in a circumferential direction of said cylindrical portion around an entirety of an inner circumference of said cylindrical portion.

8. The master cylinder of claim 5, wherein said cylindrical portion includes at least two inner sealing portions and more than two outer sealing portions, wherein each of said inner sealing portions is located between a different adjacent pair of said outer sealing projections with respect to an axial direction of said cylindrical portion.

* * * * *

UNITED STATES PATENT AND TRADEMARK OFFICE
CERTIFICATE OF CORRECTION

PATENT NO. : 6,035,636
DATED : March 14, 2000
INVENTOR(S) : Takato OGIWARA et al.

It is certified that error appears in the above-identified patent and that said Letters Patent is hereby corrected as shown below:

in column 7, line 12 (which is also claim 1, line 25) change "anal" to --axial--.

Signed and Sealed this

Twentieth Day of February, 2001

Attest:

NICHOLAS P. GODICI

Attesting Officer

Acting Director of the United States Patent and Trademark Office